(12) United States Patent
Gemin et al.

(10) Patent No.: US 8,362,638 B2
(45) Date of Patent: Jan. 29, 2013

(54) SYSTEMS AND METHODS FOR PROVIDING AN UNINTERRUPTIBLE POWER SUPPLY TO A SHIP-SERVICE BUS OF A MARINE VESSEL

(75) Inventors: Paul R. Gemin, Cincinnati, OH (US); Ralph Teichmann, Niskayuna, NY (US); Kiyoung Chung, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/422,721

(22) Filed: Mar. 16, 2012

(65) Prior Publication Data

US 2012/0175947 A1 Jul. 12, 2012

Related U.S. Application Data

(63) Continuation of application No. 12/205,519, filed on Sep. 5, 2008, now Pat. No. 8,159,082.

(51) Int. Cl.
*B60L 1/00* (2006.01)
*H02J 9/00* (2006.01)

(52) U.S. Cl. ............................................ 307/9.1; 307/64
(58) Field of Classification Search .................. 307/9.1, 307/64
See application file for complete search history.

(56) References Cited

U.S. PATENT DOCUMENTS

| | | | |
|---|---|---|---|
| 5,616,056 A | 4/1997 | Meissner | |
| 5,880,537 A | 3/1999 | Windhorn | |
| 6,033,271 A | 3/2000 | Shafer | |
| 6,188,139 B1 | 2/2001 | Thaxton et al. | |
| 7,147,523 B2 | 12/2006 | Mori et al. | |
| 7,241,192 B2 | 7/2007 | Andersen et al. | |
| 7,505,294 B2 * | 3/2009 | Ahmed et al. | 363/141 |
| 7,544,108 B2 | 6/2009 | Rzadki et al. | |
| 2010/0105259 A1 | 4/2010 | Wejrzanowski et al. | |

FOREIGN PATENT DOCUMENTS

| | | |
|---|---|---|
| JP | 55087699 A | 7/1980 |
| WO | 2008113999 A1 | 9/2008 |
| WO | 2008145651 A1 | 12/2008 |

OTHER PUBLICATIONS

Search Report under Section 17(5) from Intellectual Property Office, Great Britain, for co-pending GB patent application No. GB914974.1 (4 pages).

* cited by examiner

*Primary Examiner* — Michael Rutland Wallis
(74) *Attorney, Agent, or Firm* — David J. Clement, Esq.; Armstrong Teasdale LLP

(57) ABSTRACT

A marine vessel power and propulsion system that provides a vessel-wide uninterruptible power supply is described. The power and propulsion system includes a propulsion system including a prime mover coupled to a motor/generator and a propulsion device. The motor/generator is configured to be driven by the prime mover and to generate alternating current (AC) electric power. The power and propulsion system also includes a ship-service electrical system including a generator set and a ship-service bus. The generator set is configured to generate ship-service electric power for distribution over the ship-service bus. The power and propulsion system also includes a bi-directional converter configured to couple the propulsion system to the ship-service electrical system and to convert AC electric power generated by the propulsion system to ship-service electric power for distribution over the ship-service electrical system.

12 Claims, 4 Drawing Sheets

SYSTEMS AND METHODS FOR PROVIDING AN UNINTERRUPTIBLE POWER SUPPLY TO A SHIP-SERVICE BUS OF A MARINE VESSEL

CROSS-REFERENCE TO RELATED APPLICATION

This application is a continuation application of and claims priority to U.S. patent application Ser. No. 12/205,519, filed Sep. 5, 2008, which is hereby incorporated by reference in its entirety.

BACKGROUND OF THE INVENTION

The field of the disclosure relates generally to service electric generation systems and propulsion systems, and more specifically to a ship propulsion system configured to also provide power to a ship service bus.

At least some known marine vessels include a ship-service generator set that includes an engine driving a generator. The generator set is utilized to provide power to an electric distribution system within the vessel. The electric distribution system includes a ship-service bus. A plurality of loads are coupled to the ship-service bus and receive power from the electric distribution system. Known marine vessels also include a propulsion system. Typically, the propulsion system includes a prime mover that drives a propulsion device, for example, a propeller. Some known propulsion systems are referred to as hybrid propulsion systems, and may include an electric motor to drive the propulsion device, or aid the prime mover in driving the propulsion device.

Known marine vessels may also include uninterruptible power supplies (UPS) connected to certain equipment within the vessel that is deemed to be critical to the vessels operation. Since the ship-service generator set, the propulsion system, and the UPS are separate systems, each system adds components to the contents of the marine vessel, requiring space and adding weight to the vessel. Moreover, it may be advantageous for the sake of redundancy, to couple more than one ship-service generator set to the electric distribution system to ensure electricity is available even in the event one generator set is not operating. Each ship-service generator set may be run at a fraction of rated load so that if one of the generator sets malfunctions, the other generator sets can supply the full electrical load without interruption of power. Since generator set engines, for example gas turbine engines, operate most efficiently at or near a rated power, this redundant configuration may limit the efficiency of the electrical distribution system. A vessel that includes a UPS, which may provide power to select components of the vessel until a backup generator set is started and brought online, may operate the main generator set at a higher load, and therefore higher efficiency.

BRIEF DESCRIPTION OF THE INVENTION

In one aspect, a marine vessel power and propulsion system that provides a vessel-wide uninterruptible power supply is provided. The power and propulsion system includes a propulsion system including a prime mover coupled to a motor/generator and a propulsion device. The motor/generator is configured to be driven by the prime mover and to generate alternating current (AC) electric power. The power and propulsion system also includes a ship-service electrical system including a generator set and a ship-service bus. The generator set is configured to generate ship-service electric power for distribution over the ship-service bus. The power and propulsion system also includes a bi-directional converter configured to couple the propulsion system to the ship-service electrical system and to convert AC electric power generated by the propulsion system to ship-service electric power for distribution over the ship-service electrical system.

In another aspect, a bi-directional converter configured to provide a ship-wide uninterruptible power supply (UPS) is provided. The bi-directional converter includes a propulsion inverter coupled to a motor/generator, an energy storage converter coupled to the propulsion inverter and an energy storage device, and a ship-service inverter coupled to the energy storage converter and a ship-service bus.

In yet another aspect, a method for providing an uninterruptible power supply (UPS) to a ship-service bus of a marine vessel is provided. The method includes converting alternating current (AC) electric power generated by a motor/generator coupled to a prime mover to at least one of ship-service electric power and direct current (DC) electric power. The method also includes converting DC electric power from an energy storage device to ship-service electric power and providing ship-service electric power to the ship-service bus for delivery to a plurality of electrical devices.

DETAILED DESCRIPTION OF THE INVENTION

The following detailed description illustrates embodiments of the invention by way of example and not by way of limitation. It is contemplated that the invention has general application to propulsion and electric power systems in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
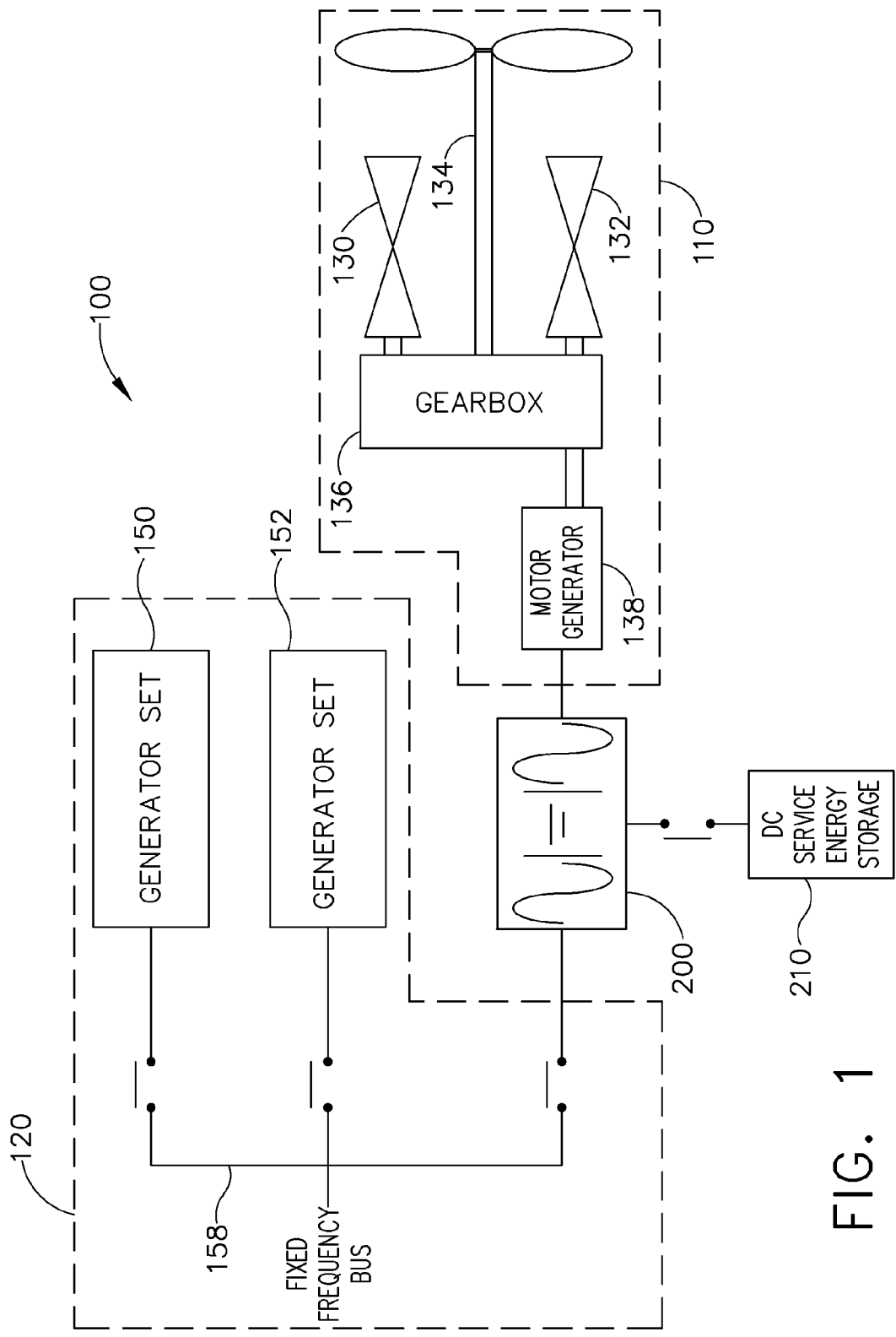
FIG. 1 is a block diagram of an exemplary embodiment of a marine vessel power and propulsion system.

FIG. 1 is a block diagram of an exemplary embodiment of a marine vessel power and propulsion system 100. System 100 includes a propulsion system 110 and an electrical system 120. In the exemplary embodiment, the propulsion system 110 includes a first prime mover 130, a second prime mover 132, a propulsion device 134, a gearbox 136 and a motor/generator 138. In some embodiments, first and second prime movers 130 and 132 are gas turbine engines, however, prime movers 130 and 132 may be any type of engine or motor that allows propulsion system 110 to function as described herein. Furthermore, although propulsion system 110 is shown including first prime mover 130 and second prime mover 132, propulsion system 110 may include one prime mover, or any number of prime movers that allow propulsion system 110 to function as described herein.

In the exemplary embodiment, first and second prime movers 130 and 132 are coupled to gearbox 136. When first and second prime movers 130 and 132 are operated, gearbox 136 transfers motion from first and second prime movers 130 and 132 to propulsion device 134. Propulsion device 134 may be a propeller, an air jet, or any other propulsion device for use in marine vessels. First and second prime movers 130 and 132 also drive motor/generator 138 through gearbox 136.

In the exemplary embodiment, electrical system 120 includes a first generator set 150 and a second generator set 152. First generator set 150 and second generator set 152 each include an engine (not shown in FIG. 1) and a generator (not shown in FIG. 1). Although electrical system 120 is shown including first and second generator sets 150 and 152, electrical system 120 may include only one generator set, or any number of generator sets that allow electrical system 120 to function as described herein. First and second generator sets 150 and 152 are coupled to a ship-service bus 158. In the exemplary embodiment, ship-service bus 158 is a fixed-frequency electrical bus that facilitates distribution of electricity to electrical devices (not shown in FIG. 1) throughout the marine vessel.

System 100 also includes a bi-directional converter 200. In the exemplary embodiment, bi-directional converter 200 is coupled to propulsion system 110 and electrical system 120. More specifically, bi-directional converter 200 is coupled to electrical system 120 through ship-service bus 158 and to propulsion system 110 through motor/generator 138. In the exemplary embodiment, bi-directional converter 200 is also coupled to at least one energy storage device 210. In some embodiments, energy storage device 210 is a battery, however, energy storage device 210 may also be a capacitor, a fuel cell, or any other energy storage device that allows system 100 to function as described herein.

In the exemplary embodiment, bi-directional converter 200 is configured to operate in at least two modes. In a first mode, at least one of ship-service bus 158 and energy storage device 210 are provided with electricity generated by motor/generator 138, which is driven by first and second prime movers 130 and 132. Motor/generator 138 rotates at a speed proportional to the operating speed of propulsion device 134, therefore, the alternating current (AC) electric power generated by motor/generator 138 is of variable frequency. Also, in the exemplary embodiment, motor/generator 138 is a high speed motor/generator that generates AC electric power having a high frequency, for example, but not limited to a range of 100 Hz to 600 Hz. Typically, ship-service bus 158 delivers AC electric power having a frequency of, for example, but not limited to 50 Hz or 60 Hz. Bi-directional converter 200 converts the high frequency AC electric power generated by motor/generator 138 to AC electric power having a predetermined fixed-frequency that matches the frequency of the ship-service bus 158. In the exemplary embodiment, a combination of generator set 150, generator set 152 and motor/generator 138 facilitate maintaining ship-service bus 158 at a predetermined power level. Although electrical system 120 is described herein as generating and delivering fixed-frequency AC electric power, in other embodiments, electrical system 120 may also generate and deliver a variable-frequency AC electric power or a DC electric power.

As described above, generator set 150 and generator set 152 may each be run at, for example, half rated power to generate a full level of power to ship-service bus 158 while providing the protection of having both generator sets operating and available for increased power in the event that one of generator sets 150 and 152 is shut down. Multiple generator sets 150 and 152 also ensure that higher amounts of power are available to ship-service bus 158 in the event a larger electrical load is placed on the ship-service bus 158. For example, some electrical equipment on a marine vessel is not constantly in use, but requires a high level of power when operated. One specific example of this is a marine vessel's radar systems.

Since generator set engines, for example gas turbine engines, operate most efficiently at or near a rated power, operating generator sets 150 and 152 at less than rated power may limit the efficiency of the electrical distribution system. In the exemplary embodiment, by distributing power generated by propulsion system 110 onto ship-service bus 158, bi-directional converter 200 allows for the use of one generator set operating at near-rated power to provide ship-service power to ship-service bus 158, while maintaining the ability to increase electric power generation if desired.

In a second mode, first and second prime movers 130 and 132 are not operating, or operating at a low level. In the second mode, electricity is provided to motor/generator 138, via bi-directional converter 200, by ship-service bus 158 and/or energy storage device 210. The motor/generator 138 converts the provided electricity to rotational energy used to operate propulsion device 134. Bi-directional converter 200, in the second mode, facilitates propulsion of the marine vessel using electricity generated by generator set 150 and/or generator set 152, or provided by energy storage device 210.

In the exemplary embodiment, system 100 also provides a UPS sized to supply full ship-service power to ship-service bus 158 for a predetermined period of time. This predetermined period of time is long enough to maintain ship-service power while generator sets 150 and/or 152 are brought back on-line after an event. Bi-directional converter 200 receives direct current (DC) electric power from energy storage device 210 and converts it to ship-service electric power, for example, fixed-frequency AC electric power, that is provided to ship-service bus 158.

Figure 2:
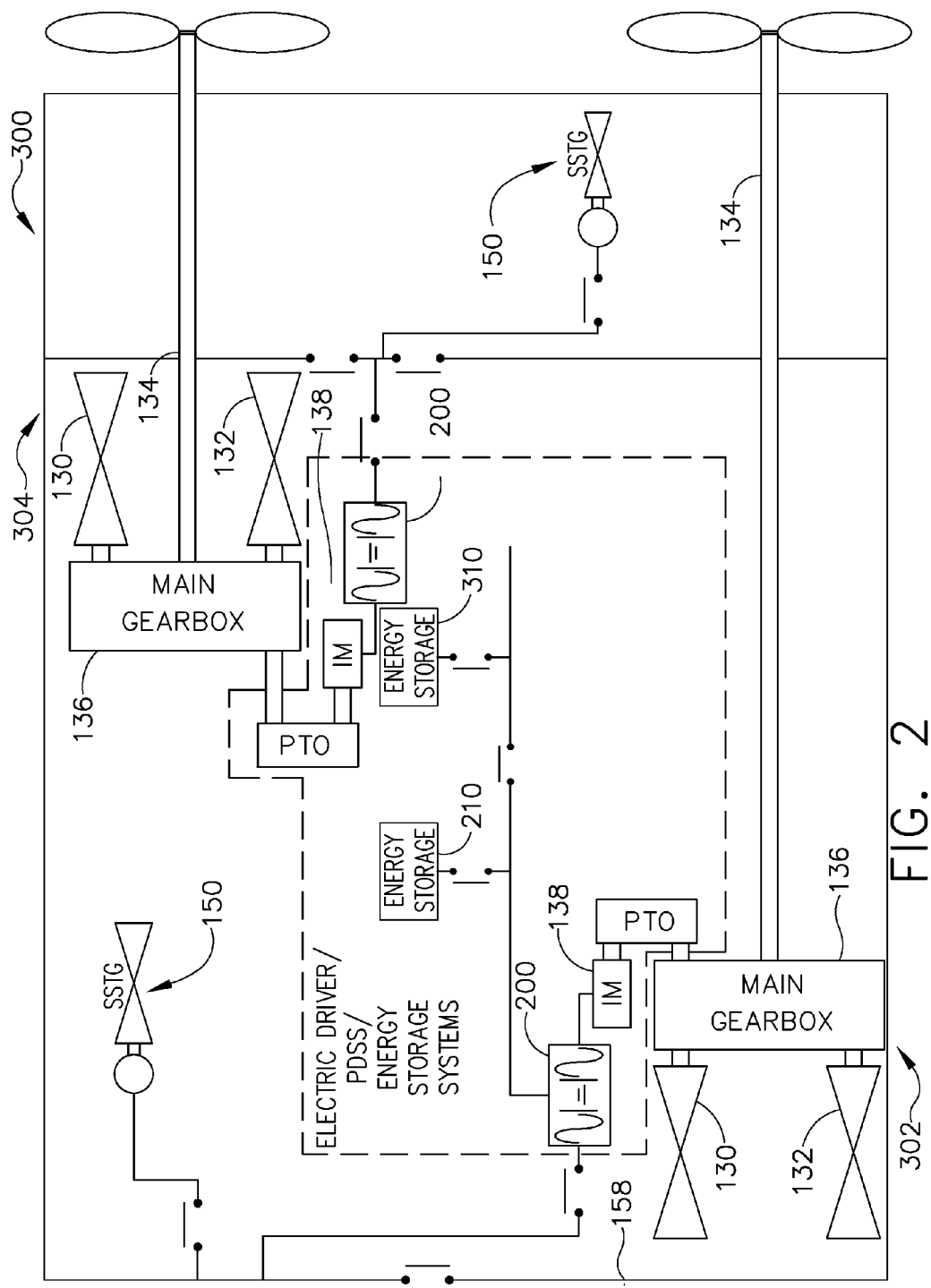
FIG. 2 is block diagram of another exemplary embodiment of the marine vessel power and propulsion system shown in FIG. 1.

FIG. 2 is block diagram of an alternative embodiment of a marine vessel power and propulsion system 300. System 300 is an example of multiple systems 100 (shown in FIG. 1) coupled together. For example, system 300 includes a first marine vessel power and propulsion system 302 and a second marine vessel power and propulsion system 304. Components shared between system 100 (shown in FIG. 1) and systems 302 and 304 are identified with the same reference numerals. In the exemplary embodiment, power and propulsion system 300 includes two energy storage devices 210 and 310. Both energy storage devices 210 and 310 are coupled to bi-directional converter 200 of system 302 and bi-directional converter 200 of system 304. By being coupled together, each of systems 302 and 304 have access to both energy storage devices 210 and 310. Having access to both energy storage devices 210 and 310 facilitates enhancing the UPS capabilities for both system 302 and system 304 by increasing the amount of stored energy available to each of systems 302 and 304 and by adding a layer of energy storage redundancy.

Figure 3:
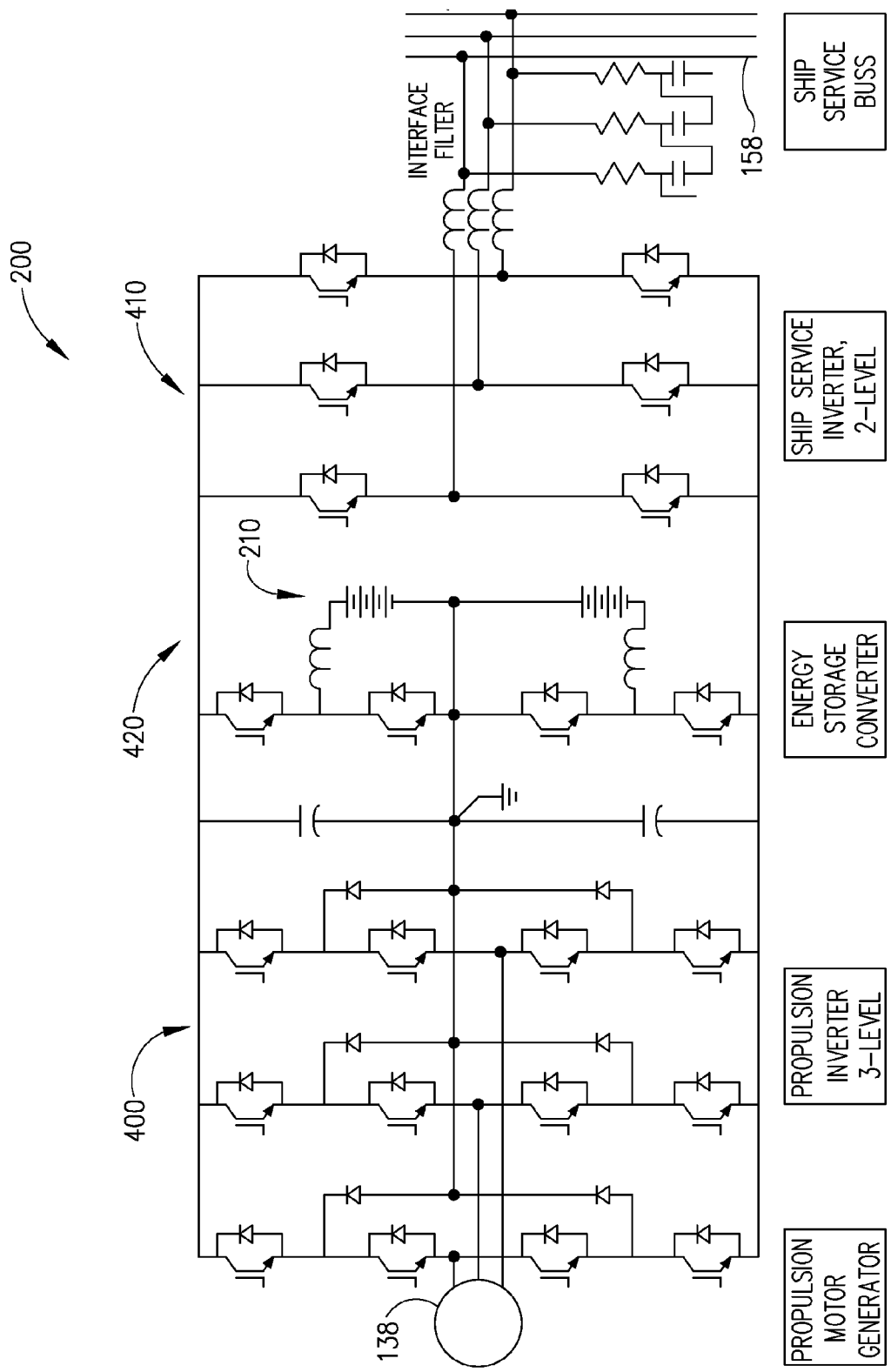
FIG. 3 is a circuit diagram of an exemplary bi-directional converter.

FIG. 3 is a circuit diagram of an exemplary bi-directional converter 200 (shown in FIGS. 1 and 2). In the exemplary embodiment, bi-directional converter 200 includes two inverters and one energy storage converter. More specifically, bi-directional converter 200 includes a propulsion inverter 400 coupled to a ship-service inverter 410 and an energy storage converter 420. As described above, bi-directional converter 200 operates in two modes, either directing electric power to ship-service bus 158 or directing electric power to motor/generator 138. Each of propulsion inverter 400, ship-service inverter 410, and energy storage converter 420 operate in two modes.

In the exemplary embodiment, motor/generator 138 is coupled to propulsion inverter 400. In the first mode, propulsion inverter 400 converts generated AC electric power to DC electric power that is provided to energy storage converter 420 and ship-service inverter 410. In the second mode, propulsion inverter 400 converts DC electric power from energy storage device 210, or DC electric power that is output by ship-service inverter 410, to AC electric power to drive motor/generator 138. In the exemplary embodiment, propulsion inverter 400 is a three-level inverter. The three-level inverter facilitates reducing the frequency of the AC electric power generated by motor/generator 138 to, for example, 50 Hz or 60 Hz, for delivery to ship-service bus 158.

In the exemplary embodiment, energy storage converter 420 is a DC to DC converter. Energy storage converter 420 operates in two modes, either receiving DC electric power from either propulsion inverter 400 or ship-service inverter 410, or providing DC electric power to propulsion inverter 400 or ship-service inverter 410. In the first mode, the received DC electric power is used to re-charge energy storage device 210. In the second mode, energy storage converter 420 provides DC electric power to either propulsion inverter 400 or ship-service inverter 410, which facilitates UPS capabilities of system 100 (shown in FIG. 1).

Ship-service inverter 410 also operates in two modes. In the first mode, ship-service inverter 410 receives DC electric power from either energy storage converter 420 or propulsion inverter 400. Ship-service inverter 410 converts the DC electric power to AC electric power and provides the AC electric power to ship-service bus 158. In the second mode, ship-service inverter 410 receives AC electric power from ship-service bus 158 and converts the AC electric power to DC electric power and provides the DC electric power to the energy storage converter 420 and the propulsion inverter 400.

As described herein, bi-directional converter 200 facilitates ship propulsion from electric power produced by, for example, generator set 150 (shown in FIG. 1). Bi-directional converter 200 also facilitates providing electric power to ship-service bus 158 that is generated by motor/generator 138 that is driven by a propulsion prime mover. By facilitating use of electric power generated by the propulsion system, bi-directional converter 200 facilitates reducing the number of generator sets.

Figure 4:
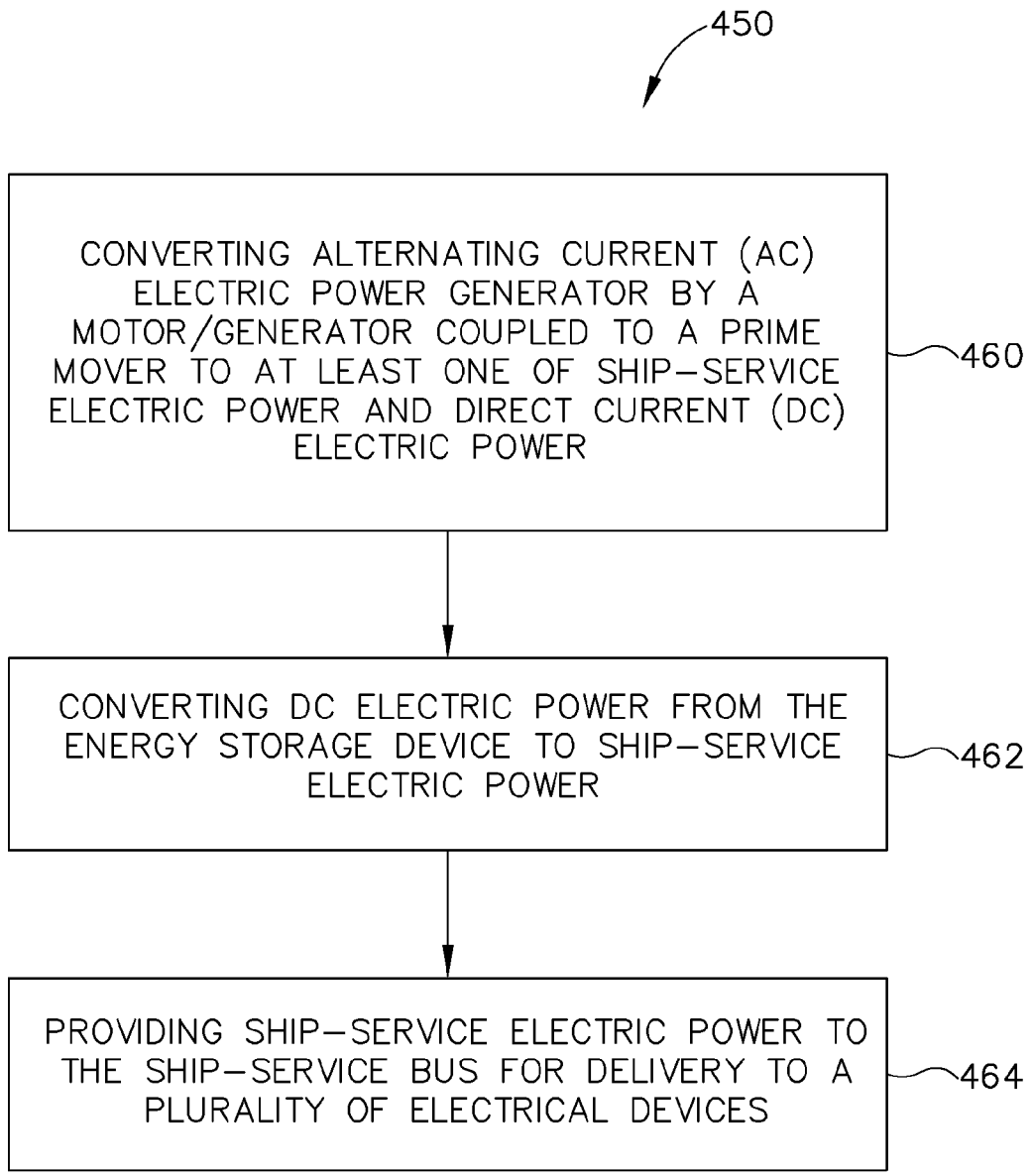
FIG. 4 is a flowchart of an exemplary method for providing uninterruptible power supply to a ship-service bus of a marine vessel.

FIG. 4 is a flowchart 450 of an exemplary method for providing a UPS to ship-service bus 158 (shown in FIG. 1) of a marine vessel. The exemplary method includes converting 460 alternating current (AC) electric power generated by motor/generator 138 (shown in FIG. 1) to at least one of ship-service electric power and direct current (DC) electric power. As described above, motor/generator 138 generates AC electric power when driven by a prime mover, for example, prime mover 130 of propulsion system 110. In the exemplary embodiment, the ship-service electric power is a fixed-frequency AC electric power, however, ship-service electric power may also include variable-frequency AC electric power or DC electric power.

In the exemplary embodiment, converting 460 to ship-service electric power includes converting generated AC electric power having a high frequency to a lower, fixed-frequency, AC electric power. As described above, since motor/generator 138 is driven by a prime mover at a high speed, a high frequency AC electric power is generated by motor/generator 138. Converting 460 to fixed-frequency AC electric power facilitates applying AC electric power generated by motor/generator 138 to fixed-frequency ship-service bus 158, at a lower frequency.

The exemplary method also includes converting 462 DC electric power from the energy storage device 210 to fixed-frequency AC electric power. The method also includes providing 464 fixed-frequency AC electric power to the ship-service bus 158 for delivery to a plurality of electrical devices.

Converting 460 may include converting AC electric power generated by motor/generator 138 to DC electric power for recharging the energy storage device 210. The exemplary method may also include converting fixed-frequency AC electric power from the ship-service bus 158 to DC electric power for recharging the energy storage device 210. Energy storage device 210 is selected to store enough power to provide ship-service bus 158 with electric power to operate the electrical devices coupled to the ship-service bus for a predetermined length of time. In at least one example, an energy storage device is selected that stores enough electric power to operate the electrical devices coupled to the ship-service bus for a period of time that is long enough for a non-operational generator set to be brought back on-line. In some examples, the predetermined period of time is in the range of five to twenty minutes.

The above-described embodiments of a method and systems for powering a propulsion system and an electric distribution system provide a cost-effective and reliable means for providing a UPS to a ship-service bus of a marine vessel. More specifically, the method and systems described herein facilitate ensuring minimal disruption of electrical devices in a marine vessel in the event of a generator set malfunction. The method and systems described herein also facilitate ensuring enough power is available on the ship-service bus for high-load electrical applications.

In addition, the above-described method and systems facilitate integrating UPS capabilities into a bi-directional converter having other functions in the vessel. This reduces the amount of installed equipment when compared to a UPS system having a separate inverter. The above described bi-directional converter also allows for the use of a compact motor/generator due to the converter's ability to convert high frequency AC electric power to lower, fixed-frequency AC electric power suitable for distribution on the ship-service bus. Furthermore, the method and systems described herein facilitate reducing the number of generator sets on the marine vessel by converting AC electric power generated from the mechanical energy of a prime mover, to a usable fixed-frequency AC electric power for distribution on a ship-service bus. Additionally, the bi-directionality of the converter also facilitates using a motor/generator to propel the marine vessel, powered by electric power generated by generator sets typically reserved for ship-service electrical applications, rather than using a prime mover. As a result, the method and systems described herein facilitate UPS capabilities in a marine vessel in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bi-directional converter configured to provide a ship-wide uninterruptible power supply (UPS), said bi-directional converter comprising:

a propulsion inverter electrically coupled to a motor/generator and an energy storage device and configured to convert AC ship-service electric power from a ship-service bus to DC electric power for recharging said energy storage device and at least one of:
  convert direct current (DC) electric power from said energy storage device to alternating current (AC) electric power for powering said motor/generator, and convert AC electric power generated by said motor/generator to DC electric power; and
a ship-service inverter electrically coupled to said propulsion inverter, said energy storage device, and a ship-service bus, said ship-service inverter configured to convert DC electric power from at least one of said propulsion inverter and said energy storage device to AC ship-service electric power.

2. A bi-directional converter in accordance with claim 1, wherein said propulsion inverter is configured to operate in a first mode and a second mode, wherein the first mode comprises said motor/generator supplying said propulsion inverter with the AC electric power and the second mode comprises said propulsion inverter supplying said motor/generator with AC electric power.

3. A bi-directional converter in accordance with claim 2, wherein the second mode further comprises said propulsion inverter receiving DC electric power from at least one of said energy storage device and said ship-service inverter.

4. A bi-directional converter in accordance with claim 2, wherein said motor/generator is configured to be coupled to a ship propulsion device and a prime mover, wherein in the first mode said prime mover drives said motor/generator, generating AC electric power that is supplied to said propulsion inverter, and wherein in the second mode said motor/generator receives AC electric power via said propulsion inverter and drives said ship propulsion device.

5. A bi-directional converter in accordance with claim 1, wherein said ship-service inverter is configured to provide the AC ship-service electric power to said ship-service bus for distribution over said ship-service bus.

6. A bi-directional converter in accordance with claim 1, wherein said ship-service bus is a fixed frequency electrical bus configured to supply fixed-frequency AC power to electrical components within a vessel.

7. A bi-directional converter in accordance with claim 1, wherein said propulsion inverter comprises a multi-level inverter, said multi-level inverter configured to permit high frequency operation of said motor/generator.

8. A bi-directional converter in accordance with claim 1, wherein said ship-service inverter comprises a multi-level inverter.

9. A bi-directional converter in accordance with claim 1, wherein said ship-service inverter is further configured to:
  convert AC ship-service electric power from said ship-service bus to DC electric power; and
  provide the DC electric power to said propulsion inverter, wherein said propulsion inverter is configured to convert the DC electric power to AC electric power for powering said motor/generator.

10. A bi-directional converter in accordance with claim 1, wherein said propulsion inverter is configured to provide the DC electric power to at least one of said energy storage device and said ship-service inverter.

11. A bi-directional converter in accordance with claim 1 further comprising at least one of a DC bus and an energy storage converter for coupling said propulsion inverter to said ship-service inverter.

12. A bi-directional converter in accordance with claim 11, wherein said energy storage converter comprises a DC to DC converter.

* * * * *